United States Patent
Li et al.

(10) Patent No.: US 11,924,686 B2
(45) Date of Patent: Mar. 5, 2024

(54) MONITORING WIRELESS TRAFFIC EFFICIENCY IN A COMMUNICATION SYSTEM

(71) Applicant: NetScout Systems Texas, LLC, Plano, TX (US)

(72) Inventors: Zheng Bin Li, Dublin, CA (US); Wing F. Lo, Plano, TX (US)

(73) Assignee: NETSCOUT SYSTEMS TEXAS, LLC, Plano, TX (US)

( * ) Notice: Subject to any disclaimer, the term of this patent is extended or adjusted under 35 U.S.C. 154(b) by 307 days.

(21) Appl. No.: 17/003,397

(22) Filed: Aug. 26, 2020

(65) Prior Publication Data

US 2021/0112455 A1 Apr. 15, 2021

Related U.S. Application Data

(60) Provisional application No. 62/915,378, filed on Oct. 15, 2019.

(51) Int. Cl.
*H04W 28/08* (2023.01)

(52) U.S. Cl.
CPC ................... *H04W 28/09* (2020.05)

(58) Field of Classification Search
CPC .. H04B 7/0632; H04B 7/0617; H04B 7/0695; H04W 56/001; H04W 74/0833; H04W 72/1273; H04W 72/0413; H04W 72/085; H04W 72/1231; H04W 76/10; H04W 72/0453; H04W 76/15; H04W 84/042; H04W 88/10; H04W 28/0268; H04W 28/08; H04W 28/09; H04W 76/20; H04W 16/28; H04W 28/0231; H04W 28/085; H04W 36/14; H04W 36/165; H04W 40/12; H04W 48/06; H04W 4/029; H04W 72/0446; H04W 72/046; H04W 72/10; H04W 76/16; H04W 84/12; H04W 88/06; H04W 12/64; H04W 36/0061; H04W 36/0083; H04W 36/00837; H04W 36/0085; H04W 36/22; H04W 36/28; Y02D 30/70

See application file for complete search history.

(56) References Cited

U.S. PATENT DOCUMENTS

| | | | | |
|---|---|---|---|---|
| 6,654,803 B1* | 11/2003 | Rochford | ................ | H04L 41/22 370/254 |
| 2016/0182305 A1* | 6/2016 | Martin | ................... | G06F 21/33 370/254 |
| 2020/0107369 A1* | 4/2020 | Jeon | ................... | H04W 74/0833 |
| 2020/0213864 A1* | 7/2020 | Vanek | ................ | G06Q 30/0201 |
| 2021/0204322 A1* | 7/2021 | Lou | ................... | H04W 72/0446 |

* cited by examiner

*Primary Examiner* — Srilakshmi K Kumar
*Assistant Examiner* — Jing Gao
(74) *Attorney, Agent, or Firm* — Foley & Lardner LLP (57) ABSTRACT

A computer method and system for analyzing performance of a 5G communication network for determining 4G traffic offload characteristics. Determine relative spectrum efficiency for data downlinks and uplinks in the 5G communication network and determine values for pairs of 4G LTE primary cells and 5G NR primary cells. A heatmap is generated utilizing the determined values for depicting 4G traffic offload characteristics in a 5G communication network wherein the generated heatmap includes a generated line depicting a connection between a LTE PCell to a 5G NR PScell wherein a width of the generated line is scalable relative to a determined percentage of 5G utilized traffic in the 5G communication system.

17 Claims, 7 Drawing Sheets

MONITORING WIRELESS TRAFFIC EFFICIENCY IN A COMMUNICATION SYSTEM

CROSS REFERENCE TO RELATED APPLICATIONS

This application claims priority to U.S. Patent Application Ser. No. 62/915,378 filed Oct. 15, 2019 which is incorporated herein by reference in its entirety.

FIELD OF THE INVENTION

The present disclosure relates to a method of monitoring wireless traffic efficiency in cellular wireless communication systems.

BACKGROUND OF THE INVENTION

In order to meet the increase in the demand for wireless data traffic after the commercialization of 4th generation (4G) communication systems, considerable effort has been made to develop 5th generation (5G) communication systems. In order to achieve a high data transmission rate, 5G communication systems are being developed to be implemented in a band of extremely high frequency, or millimeter wave (mmWave), e.g., a band of 60 GHz. 5G commination systems are currently being implemented in select markets to meet the growing demand for wireless data traffic after commercialization of the 4G communication system. To achieve a high data rate, 5G communication systems utilize very high frequency (mmWave) bands (e.g., 60 gigahertz (60 GHz) bands). In order to mitigate the path loss of the radio wave in the very high frequency band and to increase the propagation distance of the radio wave, in the 5G communication system, beamforming, massive MIMO, full-dimension MIMO (FD-MIMO), Array antennas, analog beam-forming, and large scale antenna technologies are being discussed. In order to improve the network of the system, the 5G communication system has developed an advanced small cell, a cloud radio access network (cloud RAN), an ultra-dense network, (D2D), a wireless backhaul, a moving network, cooperative communication, Coordinated Multi-Points (CoMP), and interference cancellation. In addition, in the 5G system, the Advanced Coding Modulation (ACM) scheme, Hybrid FSK and QAM Modulation (FQAM) and Sliding Window Superposition Coding (SWSC), the advanced connection technology, Filter Bank Multi Carrier (FBMC) (non-orthogonal multiple access), and SCMA (sparse code multiple access) have been further developed.

It is noted that 5G will use large bandwidth in millimeter wave to provide extremely high data rates and capacity for mobile broadband services. It is to be appreciated that the coverage of millimeter wave is small because radio pathloss and penetration loss are relatively high compared with lower bands (e.g., 4G). Therefore, if there is 5G coverage in an area, it is often desirable to offload as much 4G data traffic to a 5G coverage area as possible. Thus, monitoring performance of traffic offload to 5G coverage areas is desirable for wireless operators during the 5G rollout stages.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method is described in which performance of a 5G communication network is analyzed and monitored to determine traffic offload characteristics for generating user tools to optimize performance of the 5G communications network.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents. It is to be understood that the singular forms "a," "an," and "the" include plural referents unless the context clearly dictates otherwise. Thus, for example, reference to "a component surface" includes reference to one or more of such surfaces.

Although the drawings represent an embodiment of the disclosure, the drawings are not necessarily to scale and certain features may be exaggerated or omitted in order to better illustrate and explain the disclosure. The same reference numbers are used throughout the drawings to refer to the same or similar parts.

The features and advantages of the disclosure and the method to achieve them will become more apparent from the following detailed description in conjunction with the accompanying drawings. It will be easily appreciated to those skilled in the art that various modifications, additions and substitutions are possible from the various embodiments of the disclosure that are illustrated and described in detail in the following description, and the scope of the disclosure should not be limited to the following embodiments. The various embodiments of the present disclosure are provided such that those skilled in the art completely understand the disclosure. It should be understood that the disclosure may include all modifications and/or equivalents and/or substations included in the idea and technical scope of the present disclosure. In the drawings, the same or similar elements are denoted by the same reference numbers even though they are depicted in different drawings.

In addition, it should be understood that the process and the operations of the present disclosure, described above, can be performed via computer programming instructions. These computer-programming instructions can be installed to processors of data processing equipment that can be programmed, special computers, or universal computers. The instructions, performed via the processors of data processing equipment or the computers, can generate means that perform functions described in blocks of the flow chart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow chart therein. In addition, since the computer programming instructions can also be installed to computers or data processing equipment that can be programmed, they can create processes that perform a series of operations therein, described in the blocks of the flow chart therein.

The blocks of the flow chart refer to part of codes, segments or modules that include one or more executable instructions to perform one or more logic functions. It should be noted that the functions described in the blocks of the flow chart may be performed in a different order from the various embodiments described above. For example, the functions described in two adjacent blocks may be performed at the same time or in reverse order.

In the various embodiments, the terminology, component '~unit,' refers to a software element or a hardware element such as a permanent global positioning system (GPS) geodetic array (PGGA), an application-specific integrated circuit (ASIC), etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more central processing units (CPUs) in devices or security multicards.

Figure 1:
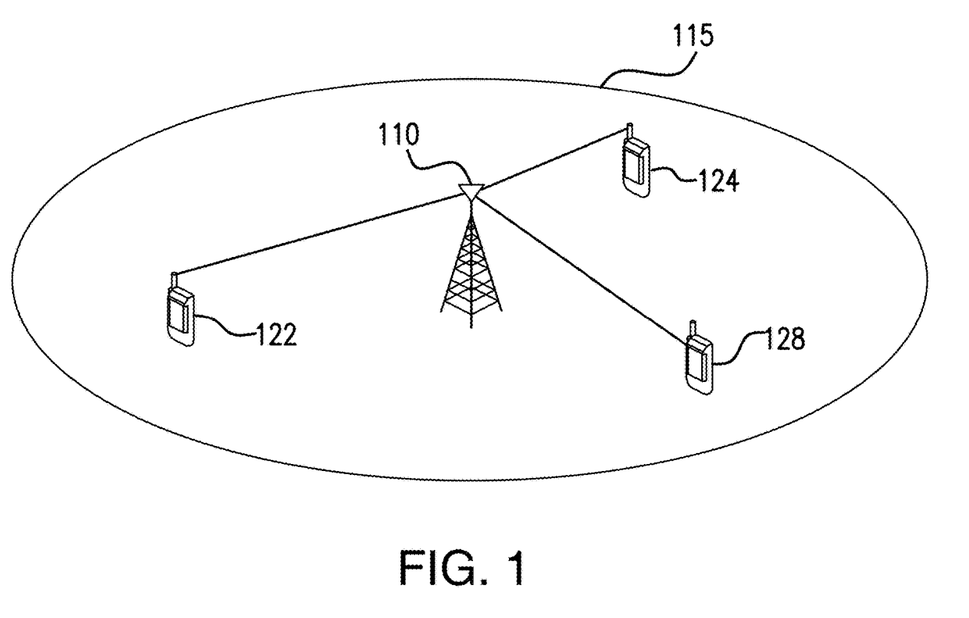
FIG. 1 is a schematic diagram depicting a wireless communication system cording to illustrated embodiments.

FIG. 1 is a schematic diagram showing a wireless communication system according to an embodiment of the present disclosure. It is to be appreciated a base station (e.g., an evolved node-B (eNB) 110 may form a cell 115 in a cellular wireless communication system. One or more user equipment devices (UEs) 122, 124, and 126 in the cell 115 may transmit/receive signals to/from the base station 110. The base station 110 may transmit scheduling information to at least one of the UEs 122, 124, and 126 through control signals, and may transmit signals to the respective UEs 122, 124, and 126 through downlink shared channels according to the scheduling information. Although there is no user data, the downlink control information may be transmitted to UEs 122, 124, and 126.

In an embodiment, there may be an interval of time (or time interval) during which user data is not transmitted to UEs 122, 124, and 126 in the cell. That is, when there is a time interval during which user data is not transmitted, signals for user data are not transmitted, but at least one of the following may be transmitted: a reference signal for channel measurement, physical broadcast channel (PBCH) for broadcast transmission, and primary synchronization signal (PSS) and/or secondary synchronization signal (SSS) for making synchronization, in a time interval during which physical downlink shared channel (PDSCH) is transmitted. Signals required for transmission may be easily transmitted with lower power in a time interval during which user data is not transmitted to PDSCH than in a time interval during which user data is transmitted.

With the essential functionalities of a wireless communication system (FIG. 1) described above, it is to be appreciated that in the initial rollout phases of 5G, non-standalone (NSA) mode may preferably be implemented. In this mode, LTE EPC core is preferably utilized whereby a LTE eNB is the master node with a 5G gNB being the secondary node, referred to as EN-DC (LTE Master, 5G NR secondary, duel connectivity). 5G gNB is preferably coupled to a UE device in a network at the request of LTE eNB to provide extra bandwidth. Standalone (SA) mode is preferably utilized in a second phase, which in this mode, 5G core will be used. It is to be understood, in this mode, 5G gNB will function as the master node with LTE eNB functioning as secondary node, referred to as NE-DC. Additionally, an LTE eNB may function as a master node and a 5G gNB may function as a secondary node, referred to as NGEN-DC.

It is to be appreciated that in order to monitor wireless traffic in 4G LTE and 5G wireless networks, the data volume transmitted in each Radio Resource Control (RRC) connection by 5G and 4G LTE networks require calculation using trace data from wireless networks. The trace data is preferably aggregated to analyze the efficiency for 4G and 5G cells, as well as associated UE devices. Each RRC connection and handover fragment are geolocated. It is to be appreciated that heat maps may be generated for indicating system efficiency.

Figure 2:
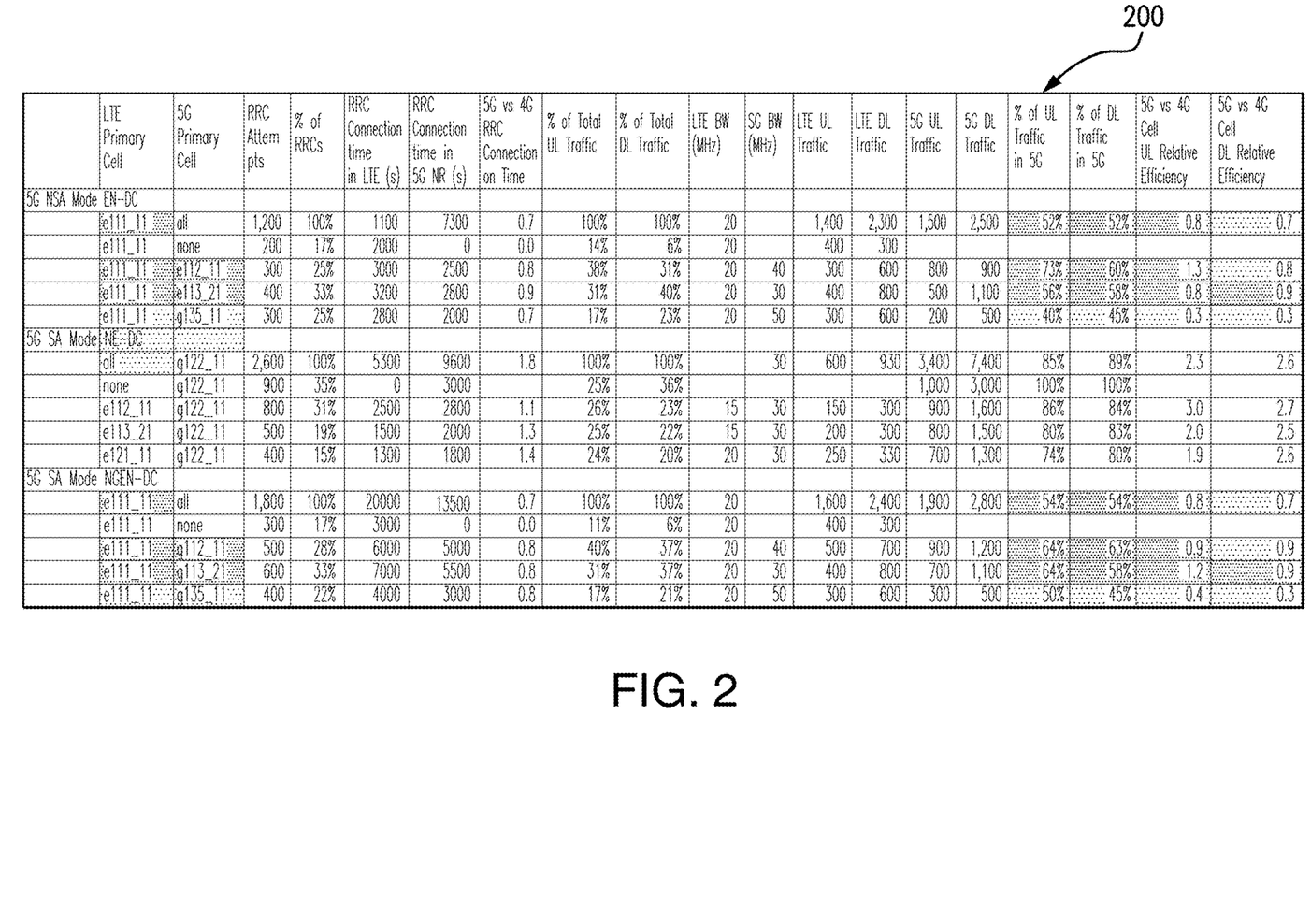
FIG. 2 illustrates an exemplary cell report for wireless traffic in a 4G LTE and 5G wireless communication system according to illustrated embodiments.

With reference now to FIG. 2, illustrated is an exemplary table 200 indicating wireless data traffic and RRC connections in 4G LTE and 5G Non-Standalone (NSA) and Standalone (SA) modes cells. In accordance with the illustrated embodiments, 5G vs 4G relative spectrum efficiency for downlink and uplink is calculated with the following formula:

5G vs 4G relative spectrum efficiency=(5G data volume/5G bandwidth)/(4G data volume/4G bandwidth)

It is noted that these values are preferably calculated for each pair of 4G LTE primary Cell and 5G NR primary cell in 5G NSA and SA modes. The overall relative efficiency of a primary cell is the average value of all pairs under the primary cell in a primary node. As indicated, the performance is evaluated and color-coded in the table 200 of FIG. 2. For instance, thresholds can be defined (and which thresholds are configurable) for performance of good (green), acceptable (grey), low (yellow), very low (red). Alerts can be generated for low performing cells in master nodes and sent to operators, such as through email or text message, but not limited thereto.

Figure 3:
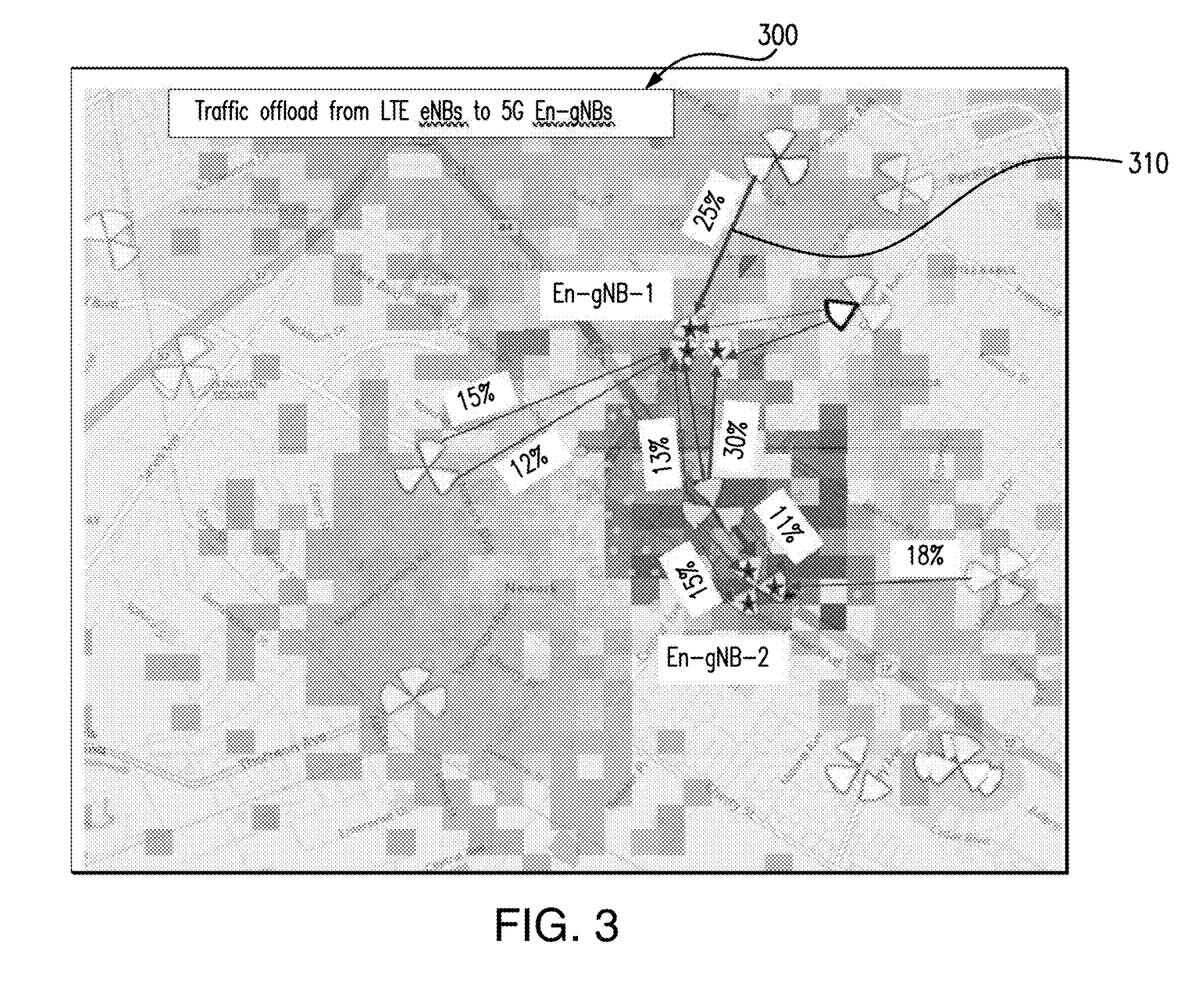
FIG. 3 illustrates a heat-map depicting a traffic offload cell relation map for 5G NSA according to illustrated embodiments.

With reference now to FIG. 3, illustrated is a heat-map 300 depicting a traffic offload cell relation map for 5G NSA, in which 5G traffic offload cell performance in 5G NSA mode is depicted. As also shown in FIG. 3, a line 310 is generated that connects a LTE PCell to a 5G NR PSCell, which in accordance with the illustrated embodiments, the line width is scaled by percentage of traffic utilizing 5G. It is to be appreciated that a similar map may be generated for 5G SA indicating a line connecting 4G or 5G cell in master node to 4G or 5G primary cell in secondary node.

Figure 4:
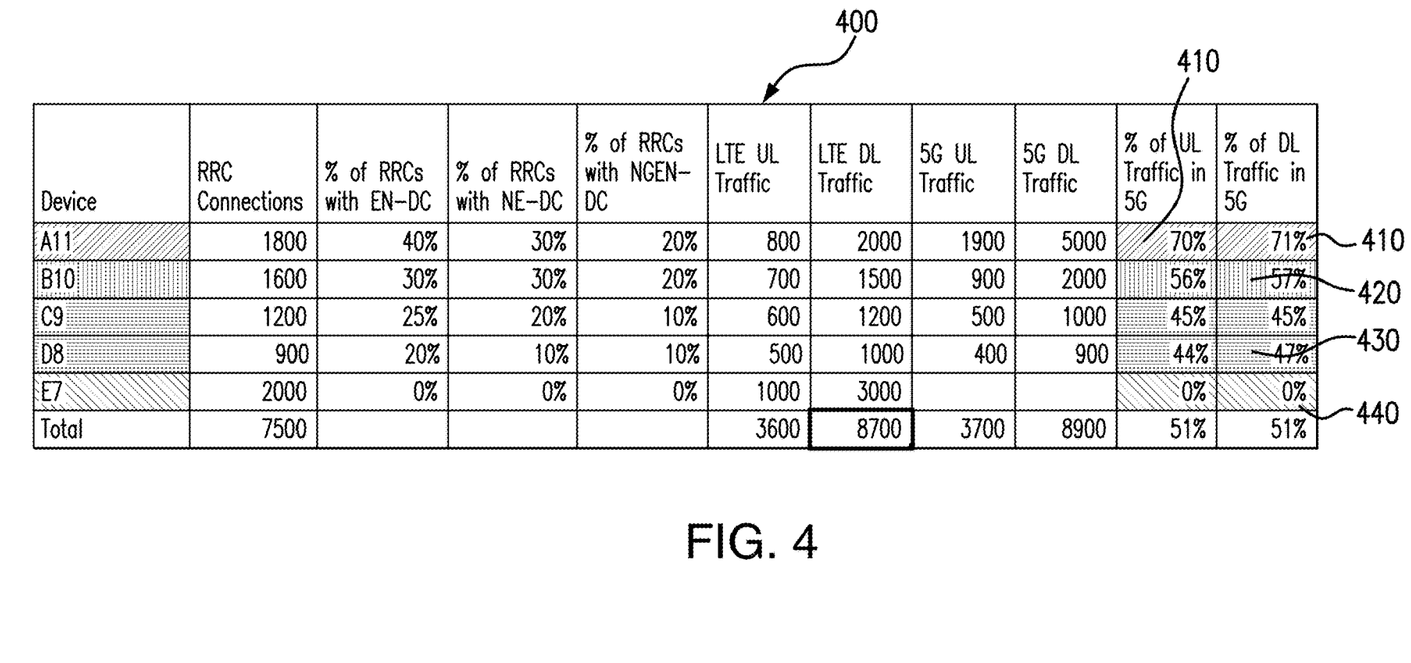
FIG. 4 illustrates a table indicating 4G and 5G traffic report for UE devices cording to illustrated embodiments.

With reference now to FIG. 4, shown is a table 400 depicting a 4G and 5G traffic report for UE devices. In accordance with the illustrated embodiments, the percentage of traffic in 5G for DL and UL are calculated. It is to be appreciated that the performance of UE devices is evaluated and color-coded based on predetermined (and configurable) thresholds. As shown in FIG. 4, the default thresholds are 70% for good (color-coded as green) (410), 50% for normal (color-coded as grey) (420), 30% for low (color-coded as yellow) (430). The devices with lower than 30% are considered as very low (colored coded as red) (440).

Figure 5:
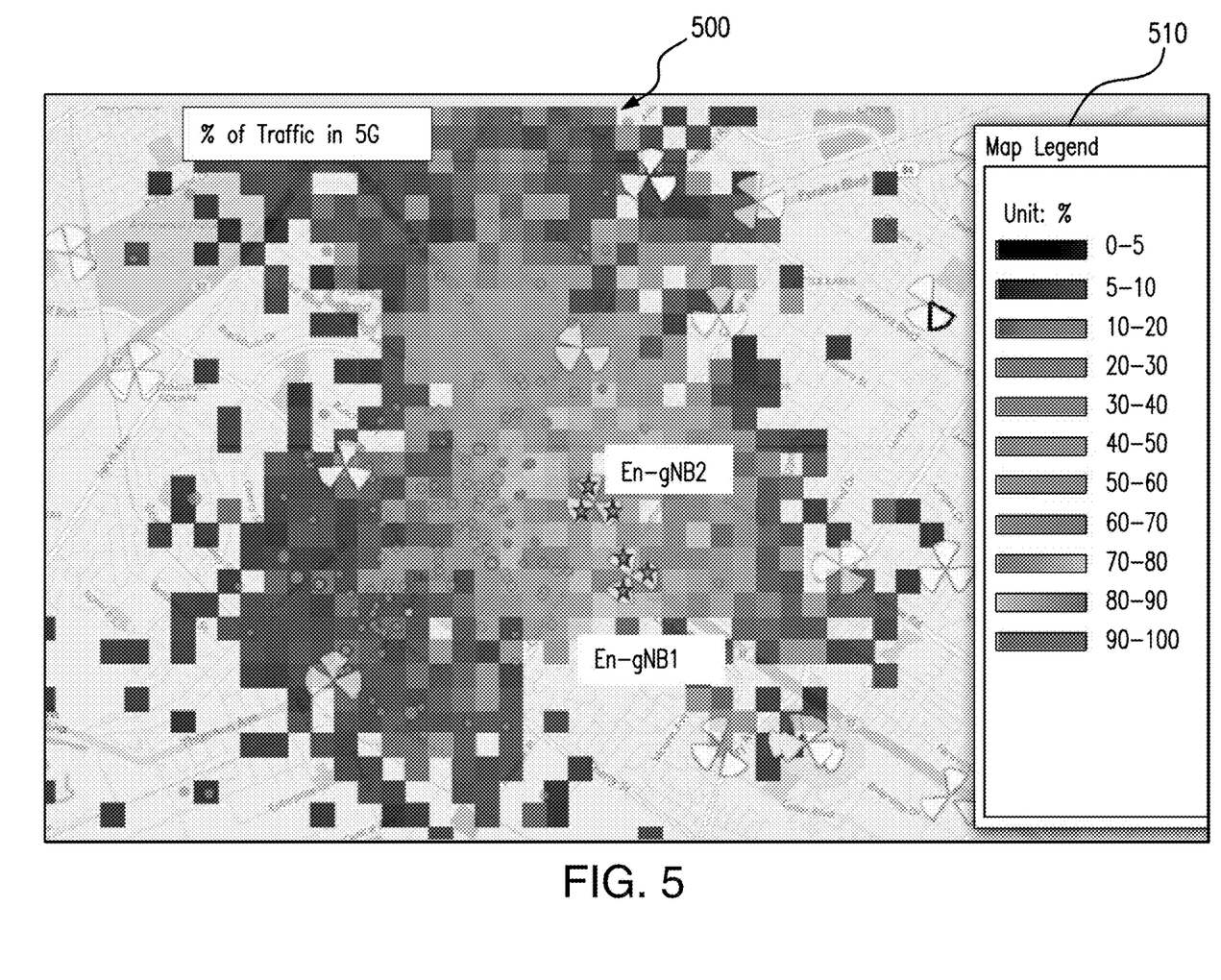
FIG. 5 illustrates a heat-map traffic depicting percentage of traffic in 5G according to illustrated embodiments.

With reference now to FIG. 5, and in accordance with the illustrated embodiments, shown is an exemplary heat map 500 generated that depicts traffic distribution between 4G LTE and 5G NR. It is to be appreciated, that in accordance with an algorithm of the illustrated embodiment, each call is geolocated. It is noted that the percentage of traffic (measured in data volume) in 5G in calls are preferably averaged in geolocation bins 510. It is to be appreciated that the bin size is user configurable, for example 1000m, 500 m, 200 m, 100 m, 50 m, etc.

Figure 6:
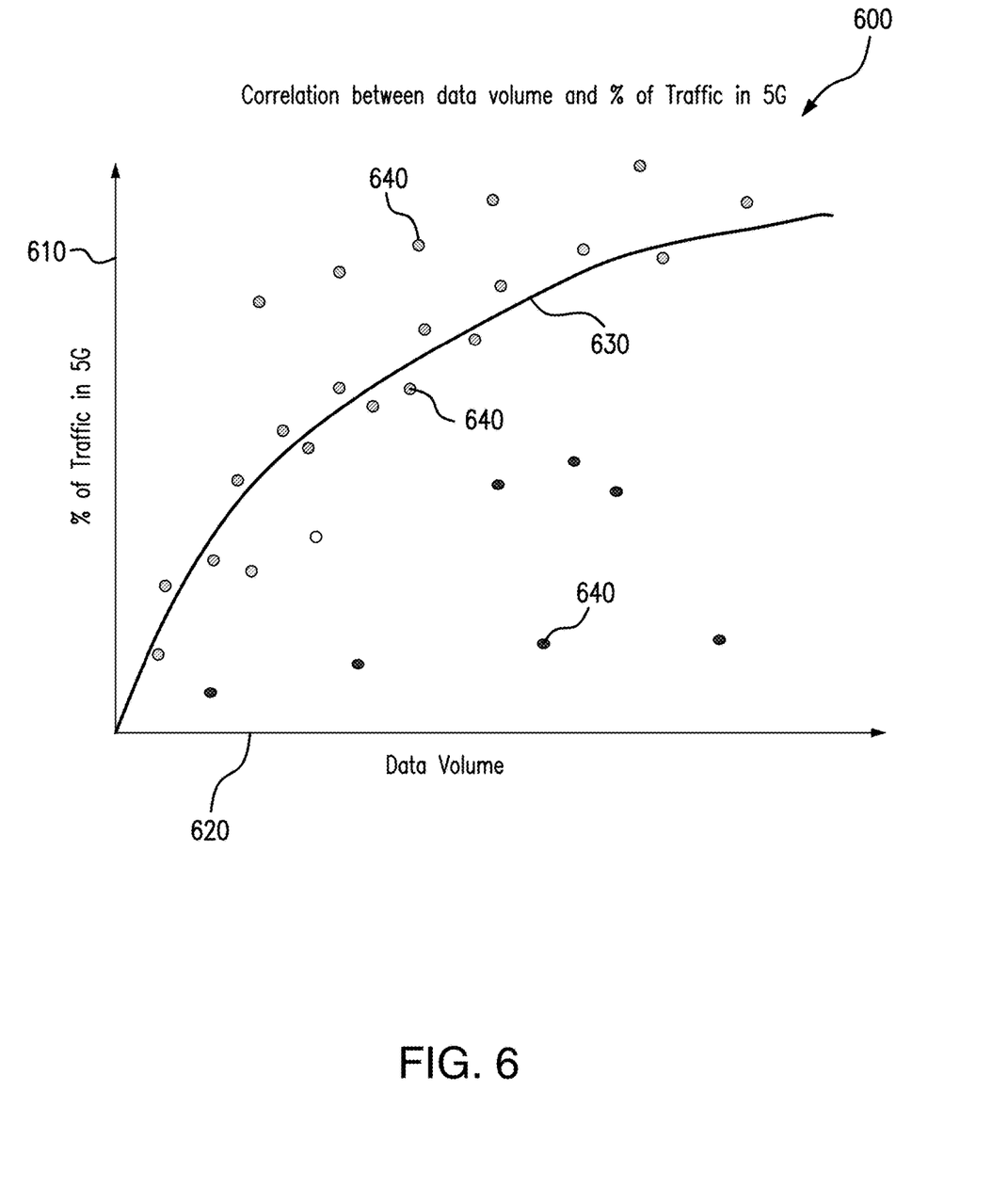
FIG. 6 illustrates a scatter plot depicting the correlation between total data volume and traffic according to the illustrated embodiments.

With reference now to FIG. 6, in accordance with the illustrated embodiments, shown is a sample scatter plot 600 generated depicting a percentage of traffic in 5G (610) relative to a total 5G data volume (620), in which an optimal curve 630 depicting both is generated and displayed. It is to be appreciated that the aforesaid depicting a percentage of traffic in 5G relative to a total 5G data volume enables user to analysis correlations between percentage of traffic in 5G (610) relative to a total 5G data volume (620). Each dot (640) generated in FIG. 6, may be one of a: call, a UE device, or a 4G or 5G PCell in master node.

It is noted that in 5G NSA, a majority of data traffic is typically in 4G LTE when data volume is low, whereby increase in the data traffic causes an increase in 5G NR data volume/traffic. It is to be further appreciated that in 5G SA, a majority of data traffic is preferably in 5G when sufficient 5G coverage is provided. Thus, the generated scatter plot of FIG. 6 illustrates which calls have low percentage of traffic in 4G enabling a system analysist to identify root causes such that the performance of 5G offload in a network can be evaluated for the calls, UE devices, and PCells in the generated plot of FIG. 6.

Figure 7:
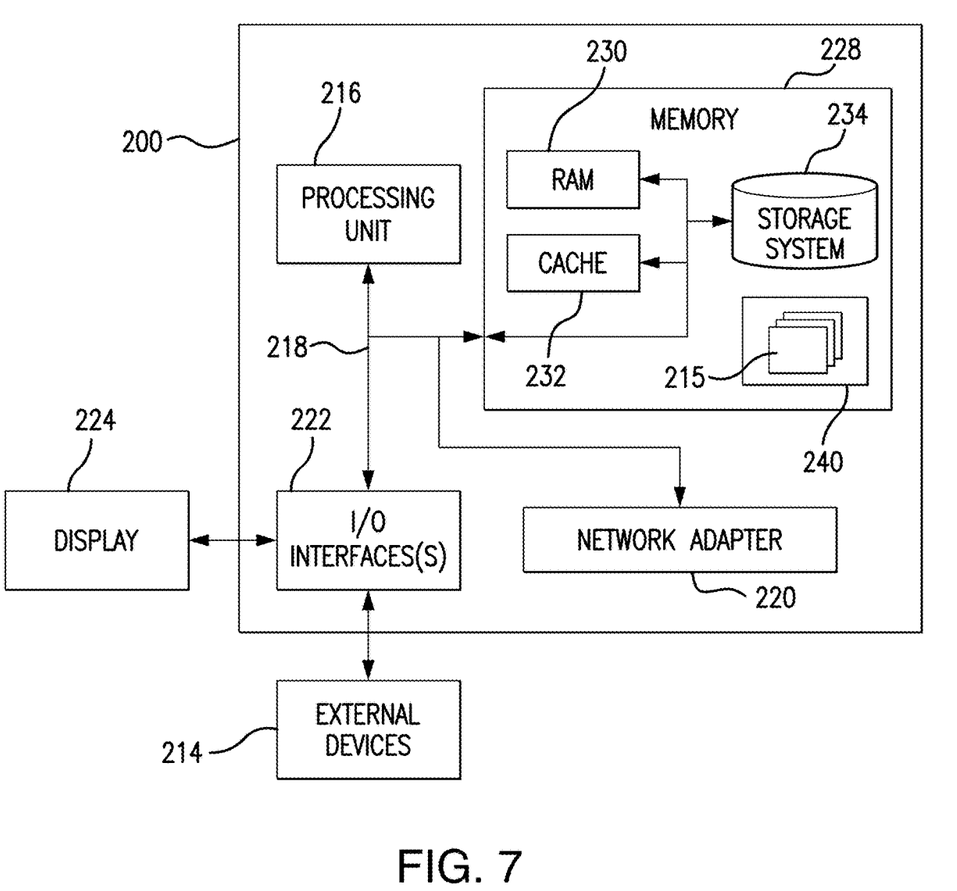
FIG. 7 illustrates an example-computing device communicatively coupled with the network of FIG. 1 for initiating the illustrated embodiments.

With reference now to FIG. 7, shown is a schematic block diagram of an example network computing device 200 that may be used (or components thereof) with one or more embodiments described herein for analysing a 5G network in accordance with the illustrated embodiments discussed herein. It is to be appreciated that different embodiments of these various devices are configured to communicate with each other in any suitable way, such as, for example, via a communication network.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous computing system environments or configurations including server computer systems and the like.

Computing device 200 may be described in the general context of a special purpose computer system having executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 7 in the form of a special purpose computing device for providing the functionality of the illustrated embodiments as described herein. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media and/or Solid State Drives (SSD) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system for analyzing performance of a 5th generation (5G) communication network for determining 4th generation (4G) traffic offload characteristics, comprising:
    a memory configured to store instructions;
    a processor disposed in communication with said memory, wherein said processor upon execution of the instructions is configured to:
        determine relative spectrum efficiency for data downlinks and uplinks in the 5G communication network;
        determine values for pairs of 4G Long Term Evolution (LTE) primary cells and 5G New Radio (NR) primary cells in the 5G communication network;
        generate a heatmap utilizing the determined values for depicting 4G traffic offload characteristics in the 5G communication network; and
        cause the generated heatmap to be displayed on a user device, wherein the generated heatmap includes a generated line depicting a connection between a LTE Primary Cell (PCell) to a 5G NR Secondary Cell (PScell) wherein a width of the generated line is scaled relative to a determined percentage of 5G utilized traffic in the 5G communication system.

2. The computer system as recited in claim 1, wherein the relative spectrum efficiency is determined using the calculation: (5G data volume/5G bandwidth)/(4G data volume/4G bandwidth).

3. The computer system as recited in claim 1, wherein the determined values for pairs of 4G LTE primary cells and 5G NR primary cells is determined for the 5G communication network utilizing both 5G Non-Standalone (NSA) and Standalone (SA) operational modes.

4. The computer system as recited in claim 1, wherein the processor is further configured to generate a scatter plot depicting a percentage of traffic in 5G relative to total 5G data volume in the 5G communication network.

5. The computer system as recited in claim 1, wherein the processor is further configured to determine a data volume transmitted in the 5G communication network in a Radio Resource Control (RRC) connection utilizing captured network trace data.

6. The computer system as recited in claim 5, wherein the captured network trace data is aggregated for determining efficiency for network 4G and 5G cells in the 5G communication network.

7. The computer system as recited in claim 5, wherein each utilized RRC connection and handover fragmentation for determining the transmitted data volume are geolocated.

8. A computer method for analyzing performance of a 5th generation (5G) communication network for determining 4th generation (4G) traffic offload characteristics, comprising:
    determining relative spectrum efficiency for data downlinks and uplinks in the 5G communication network;
    determining values for pairs of 4G Long Term Evolution (LTE) primary cells and 5G New Radio (NR) primary cells;
    generating a heatmap utilizing the determined values for depicting 4G traffic offload characteristics in a 5G communication network, wherein the generated heatmap includes a generated line depicting a connection between a LTE Primary Cell (PCell) to a 5G NR Secondary Cell (PScell) wherein a width of the generated line is scaled relative to a determined percentage of 5G utilized traffic in the 5G communication system; and
    causing the generated heatmap to be displayed on a user device.

9. The computer method as recited in claim 8, wherein the relative spectrum efficiency is determined using the calculation: (5G data volume/5G bandwidth)/(4G data volume/4G bandwidth).

10. The computer method as recited in claim 8, wherein the determined values for pairs of 4G LTE primary cells and 5G NR primary cells is determined for the 5G communication network in both 5G Non-Standalone (NSA) and Standalone (SA) operational modes.

11. The computer method as recited in claim 8, further including generating a scatter plot depicting a percentage of traffic in 5G relative to total 5G data volume in the 5G communication network.

12. The computer method as recited in claim 8, further including determining a data volume transmitted in the 5G communication network in a Radio Resource Control (RRC) connection utilizing captured network trace data.

13. The computer method as recited in claim 12, wherein the captured network trace data is aggregated for determining efficiency for network 4G and 5G cells in the 5G communication network.

14. The computer method as recited in claim 12, wherein each utilized RRC connection and handover fragmentation for determining the transmitted data volume are geolocated.

15. A non-transitory computer readable storage medium and one or more computer programs embedded therein, the computer programs comprising instructions, which when executed by a computer system, cause the computer system to analyze performance of a 5th Generation (5G) communication network for determining 4th generation (4G) traffic offload characteristics including:

determine relative spectrum efficiency for data downlinks and uplinks in the 5G communication network;

determine values for pairs of 4G Long Term Evolution (LTE) primary cells and 5G New Radio (NR) primary cells in the 5G communication network;

generate a heatmap utilizing the determined values for depicting 4G traffic offload characteristics in the 5G communication network, wherein the generated heatmap includes a generated line depicting a connection between a LTE Primary Cell (PCell) to a 5G NR Secondary Cell (PScell) wherein a width of the generated line is scaled relative to a determined percentage of 5G utilized traffic in the 5G communication system; and cause the generated heatmap to be displayed on a user device.

16. The non-transitory computer readable storage medium as recited in claim 15, wherein the relative spectrum efficiency is determined using the calculation: (5G data volume/5G bandwidth)/(4G data volume/4G bandwidth).

17. The non-transitory computer readable storage medium as recited in claim 15, wherein the determined values for pairs of 4G LTE primary cells and 5G NR primary cells is determined for the 5G communication network utilizing both 5G Non-Standalone (NSA) and Standalone (SA) operational modes.

* * * * *